(12) United States Patent
Naito et al.

(10) Patent No.: US 11,376,672 B2
(45) Date of Patent: Jul. 5, 2022

(54) SINGLE-EDGE DRILL FOR FORMING A DEEP HOLE

(71) Applicants: NISHIKEN INC., Hiroshima (JP); GOAL CO., LTD., Osaka (JP)

(72) Inventors: Takeshi Naito, Hiroshima (JP); Takahiro Kawano, Hiroshima (JP); Yuuki Nishimura, Tottori (JP)

(73) Assignees: NISHIKEN INC., Hiroshima (JP); GOAL CO., LTD., Osaka (JP)

(*) Notice: Subject to any disclaimer, the term of this patent is extended or adjusted under 35 U.S.C. 154(b) by 5 days.

(21) Appl. No.: 16/973,273

(22) PCT Filed: Aug. 23, 2019

(86) PCT No.: PCT/JP2019/033148
§ 371 (c)(1),
(2) Date: Dec. 8, 2020

(87) PCT Pub. No.: WO2021/038651
PCT Pub. Date: Mar. 4, 2021

(65) Prior Publication Data
US 2021/0260670 A1  Aug. 26, 2021

(51) Int. Cl.
*B23B 51/06* (2006.01)
*B23B 51/02* (2006.01)

(52) U.S. Cl.
CPC ............ *B23B 51/02* (2013.01); *B23B 51/063* (2022.01); *B23B 51/066* (2022.01);
(Continued)

(58) Field of Classification Search
CPC ..... B23B 51/02; B23B 51/063; B23B 51/066; B23B 51/0682; B23B 2251/201; B23B 2251/408; B23B 2251/402; B23B 2251/244; B23B 2251/40; B23B 2251/406
See application file for complete search history.

(56) References Cited

U.S. PATENT DOCUMENTS

| | | | |
|---|---|---|---|
| 2,289,065 A | * | 7/1942 | Oliver ................. B23B 51/04 451/48 |
| 2,606,464 A | * | 8/1952 | Fleischer ............. C01G 25/04 408/59 |

(Continued)

FOREIGN PATENT DOCUMENTS

| | | |
|---|---|---|
| CN | 107486578 | 12/2017 |
| DE | 3314718 | 10/1984 |

(Continued)

OTHER PUBLICATIONS

International Search Report dated Oct. 15, 2019 in International (PCT) Application No. PCT/JP2019/033148.
(Continued)

*Primary Examiner* — Chwen-Wei Su
(74) *Attorney, Agent, or Firm* — Wenderoth, Lind & Ponack, L.L.P.

(57) ABSTRACT

A single-edge drill for forming a deep hole is provided which includes a body and a shank. The body has a single chip discharge groove in the outer periphery thereof, and includes a small-diameter portion, and a large-diameter portion having coolant delivery grooves in the outer periphery thereof. The body has a core thickness at the distal end portion of the large-diameter portion. At the other portion of the body, the groove bottom of the chip discharge groove is located beyond the rotation center of the drill such that the body has no core thickness, and when taken perpendicularly to the axial direction of the drill, the cross section of the body has a crescent shape. When a hole is formed with the drill, a supply path for coolant liquid is defined between the outer peripheral surface of the small-diameter portion and the radially inner surface of the hole.

9 Claims, 13 Drawing Sheets

(52) U.S. Cl.
CPC ..... *B23B 51/0682* (2022.01); *B23B 2251/201* (2013.01); *B23B 2251/44* (2013.01)

(56) References Cited

U.S. PATENT DOCUMENTS

| | | |
|---|---|---|
| 3,191,463 A | 6/1965 | Ladendorf |
| 3,260,139 A | 7/1966 | Sanborn |
| 4,543,019 A | 9/1985 | Shikata |
| 2009/0047080 A1 | 2/2009 | Schweighofer et al. |

FOREIGN PATENT DOCUMENTS

| | | | |
|---|---|---|---|
| JP | 54-28087 | | 3/1979 |
| JP | 59-183713 | | 12/1984 |
| JP | 7-33514 | | 6/1995 |
| JP | 09309017 A | * | 12/1997 |
| JP | 2002166316 A | * | 6/2002 |
| JP | 2003-80411 | | 3/2003 |
| JP | 2004-122295 | | 4/2004 |
| JP | 2005-169600 | | 6/2005 |
| JP | 2008-529811 | | 8/2008 |
| JP | 2012-11481 | | 1/2012 |
| JP | 2013-75355 | | 4/2013 |

OTHER PUBLICATIONS

English Translation of the International Preliminary Report on Patentability dated Jan. 12, 2021 in International (PCT) Patent Application No. PCT/JP2019/033148.

\* cited by examiner

SINGLE-EDGE DRILL FOR FORMING A DEEP HOLE

TECHNICAL FIELD

The present invention relates to a deep hole-forming single-edge drill capable of stably forming, in a workpiece made of metal such as S45C, a deep hole having a depth of more than 20D (D is the diameter of the drill), without performing step feed (i.e., by performing stepless feed) while using an external oil supply method.

BACKGROUND ART

As conventional drills for forming a deep hole, for example, a drill as disclosed in Japanese Unexamined Patent Application Publication No. 2013-075355 (JP '355), gun drills, etc. are known. Double-edge twist drills are also known which can form a deep hole having a depth of, e.g., more than 20D relative to the drill diameter (see Japanese Unexamined Patent Application Publication No. 2004-122295 (JP '295) and Japanese Unexamined Patent Application Publication No. 2005-169600 (JP '600).

The drill of JP '355 is used to form a hole in a resin member. This drill has a function of supplying coolant liquid to the cutting part of the drill via an external oil supply method.

This drill includes a single chip discharge groove twisted in the normal rotation direction of the drill, from the distal end of the cutting part toward the shank of the drill, and having a half-moon shape in its cross section taken perpendicularly to the axial direction of the drill.

Further, the portion of the outer peripheral surface of the cutting part other than the chip discharge groove entirely constitutes a margin. The margin includes a sub-groove twisted around the rotational axis of the drill in the direction opposite the direction in which the chip discharge groove is twisted, to extend from the shank toward the distal end of the cutting part, such that the sub-groove generates pumping action to supply coolant liquid to the cutting part. The shank includes, in its outer periphery, a coolant guiding groove twisted in the same direction as the sub-groove.

The drill of Japanese Unexamined Patent Application Publication No. 2003-080411 (JP '411) also forms a hole using an external oil supply method, and is a double-edge drill. The drill includes, in its outer peripheral surface portion between two chip discharge grooves, a plurality of rows of cutting oil agent introduction grooves twisted in the direction opposite to the normal rotation direction of the drill. The drill further includes longitudinally elongated cutting oil agent supply grooves coupling together the rear ends, in the rotation direction of the drill, of the cutting oil agent introduction grooves, thereby supplying a cutting oil agent (coolant liquid) introduced into the cutting oil agent introduction grooves to the tip of the drill.

The deep hole-forming drill of Japanese Unexamined Patent Application Publication No. 2012-011481 (JP '481) is an internal oil supply type. The drill includes two or more cutting edges, and has a groove length (length, in the axial direction of the drill, of the section of the drill provided with chip discharge grooves) larger than the drill diameter D by 10 times or more. The drill includes two margins for each leading edge, one on the leading edge and the other at the circumferentially middle position of a corresponding land portion. The drill has a core thickness of 0.30D to 0.40D at the distal end portion thereof.

The axially rear portion of the section of the drill provided with the chip discharge grooves constitute a small-diameter portion having an outer diameter slightly smaller than the outer diameter of the large-diameter portion of the drill at its distal end portion.

The deep hole-forming drill of JP '295 is a twist drill capable of forming a deep hole having a depth of about 15 to 30D. In this drill, the core thickness of a distal end portion thereof having a cutting edge (first core thickness portion) is larger than the core thickness of a rear portion thereof connected to the shank (second core thickness portion). The drill includes a chip discharge groove having a surface roughness of 1.5S or less.

The drill of JP '600 is also a twist drill. The twist drill of JP '600 includes, at its distal end portion, a removable portion for repolishing having a core thickness back-tapered so as to gradually decrease in the axially rearward direction of the drill. The drill has, at its portion located rearward of the removable portion (i.e., closer to the shank), a core thickness uniform in the axial direction of the drill.

In the drill of JP '355, the sub-groove in the margin on the outer periphery of the drill functions to forcibly deliver coolant liquid to the tip of the drill. Since the drill has such a sub-groove, it is possible to form a hole with the drill while using a machining tool including no coolant supply device.

However, in the drill of JP '355, coolant liquid suppled from a nozzle for external oil supply flows into the chip discharge groove. The coolant liquid in the chip discharge groove flows into the sub-groove, and is delivered to the cutting part due to the above function of the sub-groove. Therefore, it is difficult to efficiently supply coolant liquid to the cutting part, while ensuring smooth discharge of chips.

Specifically, coolant liquid flowing and supplied toward the cutting part, and coolant liquid discharged and flowing from the cutting part together with chips collide against each other in a wide area of the chip discharge groove. Therefore, the flows of the coolant liquid in opposite directions cancel each other, so that the circulation of the coolant liquid deteriorates.

Also, since chips cannot be effectively washed away by coolant liquid, chip discharging performance is not ensured to the maximum.

Also, in the drill of Patent Document 1, since the groove bottom of the chip discharge groove has a convex circular arc-shape, chips introduced into the chip discharge groove tend to flow radially outwardly. Therefore, if the workpiece is made of metal, chips may damage the radially inner surface of the hole being formed in the workpiece.

In contrast thereto, since an internal oil supply method is used in a gun drill, the flows of coolant liquid in its supply direction and discharge direction never collide against each other. However, an expensive coolant supplying device including a high-pressure pump is required in the gun drill.

In the drill of JP '411, which is configured such that coolant liquid flowing into the cutting oil agent introduction grooves reaches the cutting part through the cutting oil agent supply grooves; coolant liquid supplied from outside the drill collides against coolant liquid that tends to flow in the discharge direction in wide areas of the chip discharge grooves, before flowing into the cutting oil introduction grooves. Therefore, the same problem as in the drill of JP '355arises with respect to the circulation of coolant liquid and the discharge of chips.

Also, since the drill of JP '411 is a double-edge drill having a core thickness at its center, the chip discharge grooves have a small volume. Therefore, chips are likely to clog the chip discharge grooves depending on machining conditions. In order to avoid this problem, it may be necessary to perform step feed.

The drill for forming a deep hole of JP '481 is also a double-edge drill. This drill includes a small-diameter portion having a uniform outer diameter between the shank and the large-diameter portion on its distal end side. However, this small-diameter portion is presumably provided for the purpose of reducing the contact area of the drill with the hole being formed by the drill, and it is inconceivable that the small-diameter portion would affect the supply of coolant liquid and the discharge of chips.

Since the large-diameter portion of the drill on its distal end side has a so-called double margin structure, it is apparent that, if an external oil supply method is used for this drill, coolant liquid is not delivered properly.

JP '481 discloses that the drill is preferably provided with an oil hole opening to the flank at the distal end of the drill. This implies that, if coolant liquid is supplied, this is done, not by an external oil supply method, but by an internal oil supply method, which requires a coolant liquid supplying device.

In the drill for forming a deep hole of JP '295, the core thickness of the second core thickness portion is set to be smaller than the core thickness of the first core thickness portion, thereby widening the chip discharge groove. Also, the surface roughness of the chip discharge groove is set at 1.5S or less so as to reduce the frictional resistance of chips, thereby improving the chip discharging performance of the chip discharge groove. However, in order to set the groove surface roughness at 1.5S or less, the chip discharge groove is coated with a film such as TiAlN, and the surface treatment for this purpose pushes up the cost of the drill.

While JP '295 teaches a widened chip discharge groove, because a core thickness remains at the center of the drill, there is a limit to widening the chip discharge groove, and chips may clog the chip discharge groove depending on the machining conditions.

In the drill of JP '600, the removable portion for repolishing has a core thickness which gradually decreases rearwardly in the center axis direction of the drill, thereby improving the chip discharging performance. However, in this drill, too, since a core thickness remains at the center of the drill, there is a limit to widening the chip discharge groove, and chips may clog the chip discharge groove depending on the machining conditions.

JP '600 discloses, in its drawing, an oil hole opening to the flank at the distal end of the drill. Thus, in JP '600, too, it appears that, if coolant liquid is supplied, this is done, not by an external oil supply method, but by an internal oil supply method, which requires a coolant liquid supplying device.

In view of the conventional drills as described above, it is an object of the present invention to provide a deep hole-forming single-edge drill capable of stably forming, even in a workpiece made of metal such as S45C, a deep hole having a depth of more than 20D relative to the diameter of the drill, without the need for step feed while using an external oil supply method.

Summary of the Invention

In order to achieve the above object, the present invention provides a single-edge drill for forming a deep hole comprising: a body including a cutting edge at the distal end of the body; and a shank connected to the body so as to be located rearward of the body, wherein the body has, in the outer periphery of the body, a single chip discharge groove having a concave curved groove surface, and extending from the cutting tip of the drill toward the shank in the center axis direction, wherein the body includes: a large-diameter portion having a predetermined length from the distal end of the body toward the shank, and having an outer peripheral surface constituting a margin; and a small-diameter portion located between the large-diameter portion and the shank, and having a diameter smaller than the diameter of the large-diameter portion, wherein the large-diameter portion includes, in the outer periphery of the large-diameter portion, at least one coolant delivery groove twisted in the direction opposite the normal rotation direction of the drill, wherein, the chip discharge groove has a groove bottom including a first portion which spans either the entirety of the large-diameter portion or at least the distal end side portion of the large-diameter portion, and which is at a position not beyond the rotation center of the drill, thereby providing a core thickness to the body at the first portion of the groove bottom, wherein, a second portion of the groove bottom other than the first portion of the groove bottom is located beyond the rotation center of the drill such that, at the second portion of the groove bottom, the body has no core thickness, and when taken perpendicularly to the center axis direction, the cross section of the body has a crescent shape constituted by a combination of: an outer peripheral surface constituted by a first cutout circle larger than a cutout circle formed by cutting out ⅓ of a perfect circle; and a groove surface constituted by a second cutout circle having a diameter smaller than the diameter of the outer peripheral surface constituted by the first cutout circle, wherein in using the drill, an external oil supply method is used, and wherein the drill is configured such that a supply path for coolant liquid is defined between the outer peripheral surface of the small-diameter portion and the radially inner surface of a hole being formed by the drill.

Preferred configurations of the drill according to the present invention are described below. The below-mentioned helix angles are all inclination angles relative to the center axis of the drill.

1) The amount by which the outer diameter of the small-diameter portion is smaller than the outer diameter of the large-diameter portion (which represents the diameter D of the drill) is limited to 30% or less (since, if the amount is 0%, the small-diameter portion will not be present, the amount should be more than 0%).

2) The chip discharge groove is a helical groove twisted in the normal rotation direction of the drill so as to have a positive helix angle of 15 degrees or less.

3) The at least one coolant delivery groove has a helix angle of −45 to −89 degrees.

4) The at least one coolant delivery groove comprises a plurality of coolant delivery grooves disposed such that the closer the coolant delivery grooves are located to the shank, the larger the amount by which the positions of the starting ends (ends closer to the shank) of the coolant delivery grooves are displaced rearward in the normal rotation direction of the drill.

5) The starting ends of the coolant delivery grooves are displaced rearward in the rotation direction of the drill from the chip discharge groove, thereby forming a bypass path (where no margin is present) between the chip discharge groove and the starting ends of the coolant delivery grooves.

6) The small-diameter portion includes, in the outer periphery of the small-diameter portion, a helical groove twisted in the same direction as the at least one coolant delivery groove.

7) The body includes a flank at the distal end of the body; a coolant chamber formed by recessing, toward the rear side of the drill, a portion of the flank located rearward in the normal rotation direction of the drill; and a thinning heel surface to which the coolant chamber extends, and the at least one coolant delivery groove communicates with the coolant chamber.

8) The at least one coolant delivery groove comprises a plurality of coolant delivery grooves, and the cross-sectional area of one of the coolant delivery grooves when taken perpendicularly to the longitudinal direction thereof is larger than corresponding cross-sectional areas of the other coolant delivery groove or grooves.

9) In the area between the distal end of the body and a point X displaced from the distal end of the body toward the shank by a predetermined length, the groove bottom of the chip discharge groove is core-tapered such that the groove depth of the chip discharge groove gradually increases toward the shank, and in the area between the point X and a rising portion at the terminal end of the chip discharge groove, the groove depth of the chip discharge groove is uniform, or gradually and slightly increases or decreases toward the rising portion.

10) The large-diameter portion has a length of 0.75 to 4.0D.

11) The drill further includes a removable portion for repolishing, the removable portion having a length of 0.08 to 0.15D from the distal end of the body, and having a core thickness.

Effects of the Invention

The drill of the present invention is configured such that a gap defined between the outer periphery of the small-diameter portion and the radially inner surface of the hole being formed by the drill serves as a supply path through which coolant liquid supplied from outside the drill flows to the rear end (end closer to the shank) of the large-diameter portion.

Then, due to the delivery action (pumping action due to rotation of the drill) of the (at least one) coolant delivery groove in the outer periphery of the large-diameter portion, the coolant liquid flows toward the distal end of the body and is supplied to the cutting tip.

The coolant liquid that has reached the cutting tip is discharged through the chip discharge groove together with chips shaved off by the cutting edge.

In the arrangement in which the starting end of the coolant delivery groove opens to the chip discharge groove, although supplied coolant liquid flows into the coolant delivery groove from the rear end of the large-diameter portion through the chip discharge groove, the distance between the rear end of the large-diameter portion and the starting end (inlet) of the coolant delivery groove is extremely short.

Also, when flowing into the coolant delivery groove through the chip discharge groove, coolant liquid flows along a portion of the surface of the chip discharge groove to which the starting end of the coolant delivery groove opens and along the radially inner surface of the hole being formed by the drill. In the other area of the chip discharge groove, coolant liquid flows in its discharge direction.

In this way, in the drill of the present invention, the flows of coolant liquid in its supply direction and discharge direction are separated from each other. This increases the amount of coolant liquid supplied to the cutting part per unit of time.

Because the amount of coolant liquid supplied increases, the amount of coolant liquid discharged per unit of time also increases, so that chips can be effectively washed away by the coolant liquid flowing in the discharge direction. In addition to this, in the area of the body other than the entire area or the distal end side area of its large-diameter portion, the groove bottom of the chip discharge groove is located beyond the rotation center of the drill, so that the chip discharge groove has an extremely large cross-sectional area when taken perpendicularly to the axial direction of the drill, which enables further effective discharge of chips.

For these reasons, even if the machining tool including the drill of the present invention has no internal oil supply means, it is possible to stably form even a deep hole having a depth of more than 20D relative to the diameter of the drill without performing step feed, and also without taking measures to reduce the friction coefficient of the groove surface of the chip discharge groove.

Also, since the chip discharge groove has a crescent shape constituted by a combination of a circular arc-shaped outer peripheral surface and a circular arc-shaped groove surface, chips flowing into the chip discharge groove flow along the circular arc-shaped groove surface without being guided radially outwardly, thereby effectively preventing the surface of the hole being formed by the drill from being damaged by chips

DETAILED DESCRIPTION OF THE INVENTION

Figure 1:
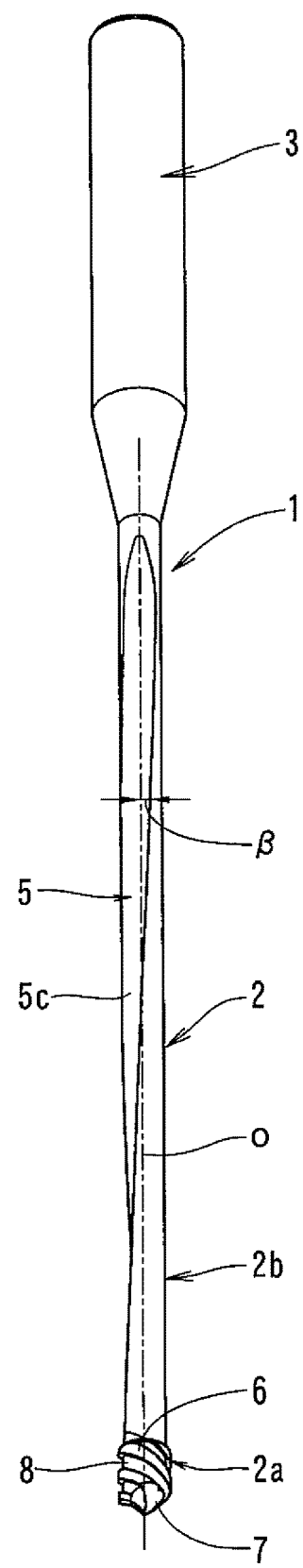
FIG. 1 is a perspective view illustrating an example of a drill according to the present invention.
Figure 2:
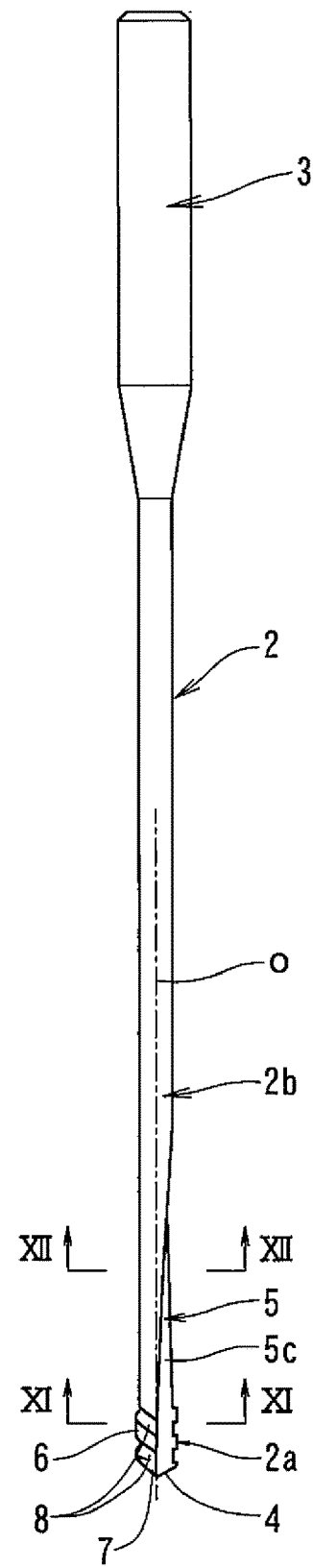
FIG. 2 is a side view of the drill of FIG. 1 in its entirety.

A single-edge drill for forming a deep hole embodying the present invention is described below with reference to the attached drawings (FIGS. 1 to 18).

As illustrated in FIGS. 1 to 4, the single-edge drill 1 shown is formed by machining an ultrahard round rod material formed by baking powder composed of ultrafine particles, and the drill 1 comprises a body 2, and a shank 3 connected to the body 2 so as to be located rearward of the body 2. The body 2 may be formed of a different material such as high-speed steel.

The body 2 includes a cutting edge 4 at its distal end (see FIGS. 2, 3 and 5), and has a tip angle α (see FIG. 3) of 110 to 160 degrees. The body 2 further includes, in its outer periphery, a single chip discharge groove 5 extending from the cutting tip of the drill toward the shank 3 in the center axis direction. The body 2 further includes, in its distal end, a thinning groove 2d (see FIG. 5) formed by cutting the groove surface of the chip discharge groove 5 at its portion displaced toward the rotation center of the drill. The diametrically central portion of the distal end of the body 2 includes a chisel edge 2f (see FIGS. 13 to 15) having a minute width as in a normal drill.

Figure 7:
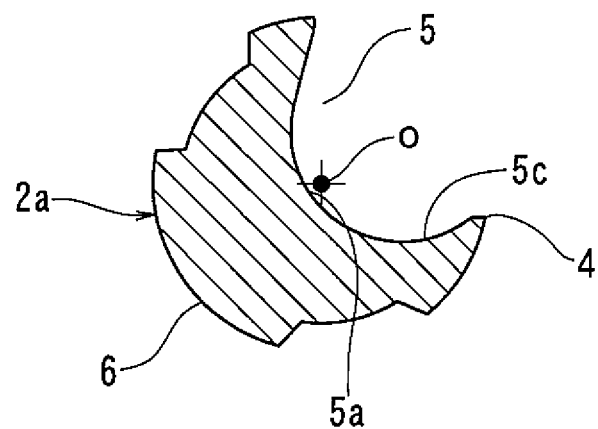
FIG. 7 is an enlarged sectional view taken along line XI-XI of FIG. 2.
Figure 8:
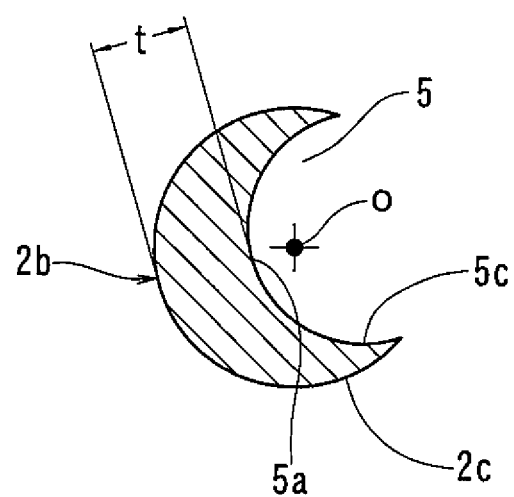
FIG. 8 is an enlarged sectional view taken along line XII-XII of FIG. 2.

The chip discharge groove 5 of the drill shown is twisted in the normal rotation direction of the drill, and has a concave curved groove surface 5c as illustrated in FIGS. 7 and 8.

The body 2 includes a large-diameter portion 2a having a predetermined length L1 (see FIG. 3) from the distal end of the body 2 toward the shank 3, and having an outer peripheral surface constituting a margin 6; and a small-diameter portion 2b located between the large-diameter portion 2a and the shank 3, and having an outer diameter smaller than the outer diameter of the large-diameter portion 2a.

The shape of the small-diameter portion 2b is not limited to a straight shape. For example, the small-diameter portion 2b may have an outer diameter which gradually changes in the longitudinal direction so as to be slightly larger at the end of the small-diameter portion 2b connected to the shank 3. If the small-diameter portion 2b has such an outer diameter, it is possible to effectively improve the strength of the small-diameter portion 2b. Such a gradual change in outer diameter is achievable with a tapered or moderately curved outer peripheral surface.

The length L1 of the large-diameter portion 2a is set to be 0.75D or more to allow straight advancement of the drill and in view of the area of the drill in which coolant delivery grooves 8 (described later) are disposed. If the drill is configured to be repolished to regenerate the function of the drill, the minimum length of the large-diameter portion 2a is preferably determined by adding 0.75D to a predetermined length of the removable portion for repolishing.

Figure 3:
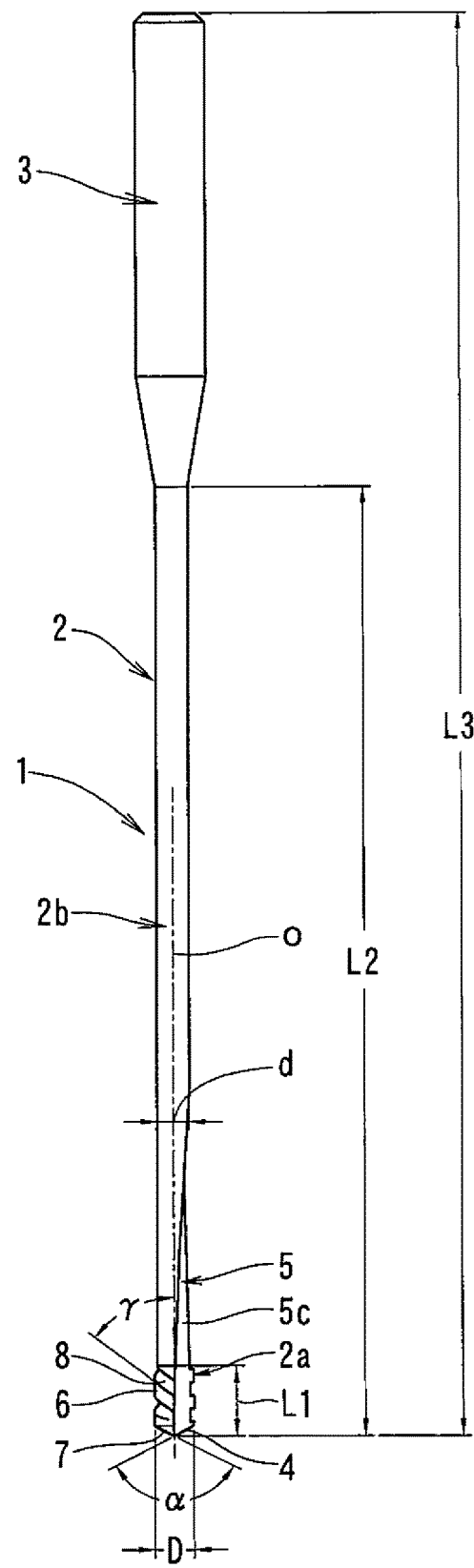
FIG. 3 is a side view illustrating some dimensions of the drill of FIG. 1.

In the drill shown, the outer diameter of the large-diameter portion 2a, shown in FIG. 3, (which represents the diameter D of the drill) is 3.2 mm, and the outer diameter d of the small-diameter portion 2b is 2.7 mm. Thus, the difference between the diameters of the large-diameter portion 2a and the small-diameter portion 2b is 0.5 mm, and a gap of 0.25 mm is defined between the outer periphery of the small-diameter portion 2b and the radially inner surface of the hole being formed by the drill.

In order to maintain the strength of the small-diameter portion 2b, the amount by which the outer diameter of the small-diameter portion 2b is smaller than the outer diameter of the large-diameter portion 2a is preferably limited to 30% or less. If the drill has a diameter of more than 10 mm, even if the difference between the diameters of the large-diameter portion 2a and the small-diameter portion 2b is fixed at a constant value of about 0.5 mm, a coolant can be sufficiently supplied along the outer periphery of the small-diameter portion 2b.

The large-diameter portion 2a has, in its outer periphery, coolant delivery grooves 8 twisted in the direction opposite the normal rotation direction of the drill, and each extending to the rear edge, in the normal rotation direction of the drill, of the margin 6 (large-diameter portion 2a) or a flank 7 at the distal end of the body 2. By providing a plurality of coolant delivery grooves 8, it is possible to increase the amount of coolant liquid supplied to the cutting tip of the drill.

While, in the example shown, three coolant delivery grooves 8 are provided that are twisted at the same helix angle, the number of coolant delivery grooves 8 is not limited to three. At least one coolant delivery groove 8 would be enough to ensure pumping action for delivering coolant liquid.

The starting end 8a of one of the coolant delivery grooves 8 opens to the axially rear end of the large-diameter portion 2a, and the starting ends 8a of the remaining coolant delivery grooves 8 open to the chip discharge groove 5 at the leading edge of the large-diameter portion 2a.

It is advantageous to use as many coolant delivery grooves 8 as possible, in that the pumping action strengthens, and the above-described configurations 3) and 4) can be adopted.

Each coolant delivery groove 8 may be any of a groove having a flat groove bottom, a concave circular arc-shaped groove, a groove having a V-shaped cross section, and a groove having an inverted trapezoidal cross section, i.e., a groove of which the groove width decreases toward the groove bottom. If the coolant delivery groove 8 has a V-shaped cross section, the widths of the two intersecting groove surface portions may be equal or unequal to each other.

Figure 4:
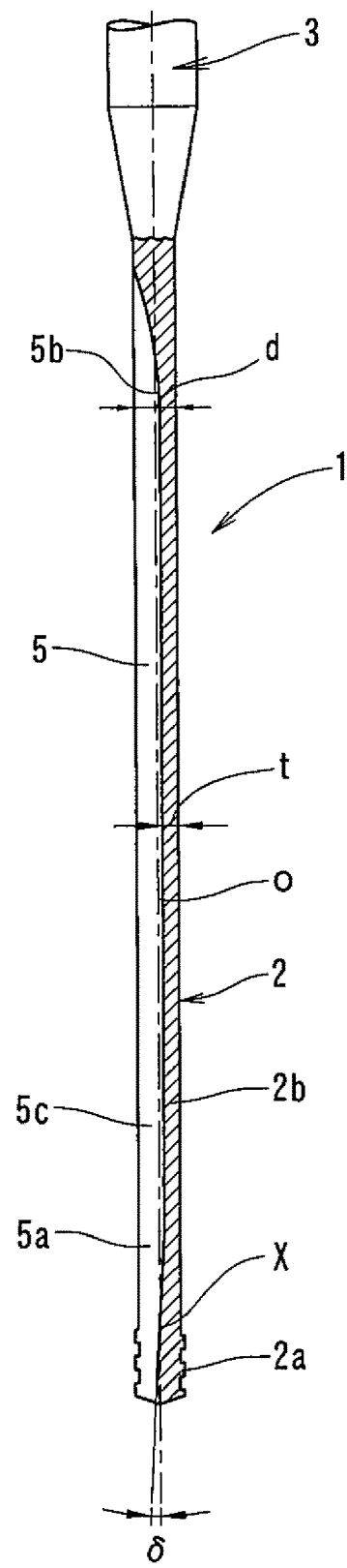
FIG. 4 is a view of the drill which is illustrated in FIG. 1, and of which a portion has been taken along the center axis of the drill.
Figure 5:
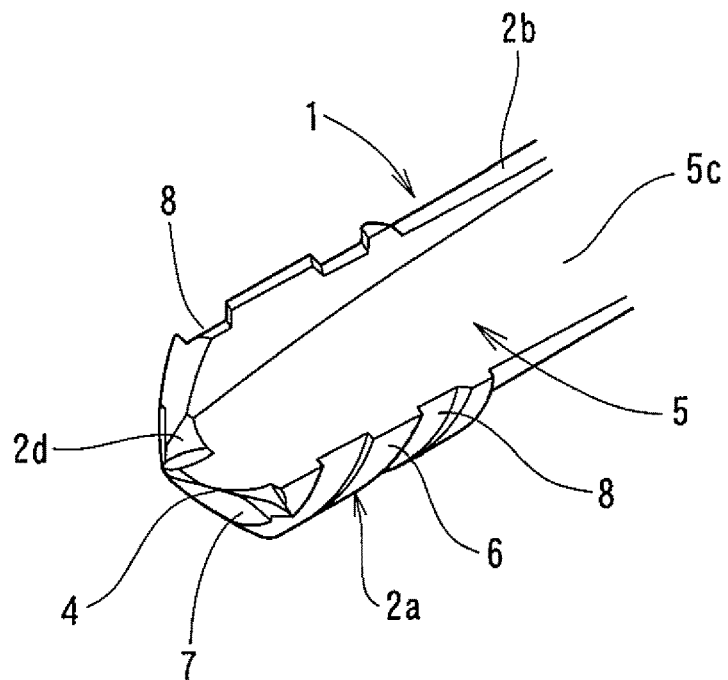
FIG. 5 is an enlarged perspective view of the distal end of the drill illustrated in FIG. 1.
Figure 6:
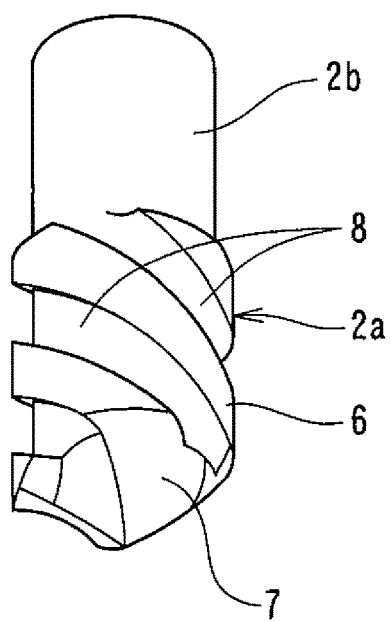
FIG. 6 is a perspective view of the distal end of the drill illustrated in FIG. 1, when seen from the opposite side of the drill distal end illustrated in FIG. 5.

The groove bottom 5a of the chip discharge groove 5 includes a core-tapered portion extending from the distal end of the body 2 to point X shown in FIG. 4, and having an inclination angle δ (3 degrees in the example shown) such that the groove depth gradually increases toward, and becomes maximum at, point X, which is the terminal end of the core-tapered portion. The chip discharge groove 5 has a uniform depth from point X to a rising portion 5b at the terminal end of the chip discharge groove 5. In the drill shown, point X is at a position displaced rearwardly, by about 4D, from the distal end of the body 2.

In the drill shown, the groove bottom 5a of the chip discharge groove 5 overlaps, near the rear end of the large-diameter portion 2a, with the rotation center O of the drill, and the drill has a core thickness at its area from this overlapping position to the distal end of the large-diameter portion 2a.

At the portion of the body 2 located rearward of the position at which the groove bottom 5a overlaps with the rotation center O of the drill, the groove bottom 5a is located beyond the rotation center O of the drill (see FIG. 8), whereby, at this portion, the chip discharge groove 5 has a large cross-sectional area when taken perpendicularly to the axial direction of the drill, and the body 2 has no core thickness.

When taken perpendicularly to the axial direction of the drill, the cross section of the portion of the body 2 having no core thickness has a crescent shape constituted by the combination of an outer peripheral surface 2c constituted by a cutout circle larger than a cutout circle formed by cutting out ⅓ of a perfect circle (i.e., closer in size to the perfect circle than is the ⅓ cutout circle); and the concave circular arc-shaped groove surface 5c (which is also constituted by a cutout circle) of the chip discharge groove 5, which is smaller in diameter than the outer peripheral surface 2c (see FIG. 8).

Due to this shape, chips flowing into the chip discharge groove 5 are pulled toward the groove bottom 5a of the chip discharge groove 5, and thus not guided radially outwardly of the chip discharge groove 5.

While in the drill shown, the chip discharge groove 5 has a uniform groove depth between point X and the rising portion 5a, the groove depth in this range may gradually increases or decreases toward the rising portion 5b, provided the amount of such gradual increase or decrease is small (the effects of such an increasing or decreasing groove depth are not described).

Since, in the drill of the present invention, chips are washed away by coolant liquid, the helix angle of the chip discharge groove 5 may be 0 (zero) degrees. However, if the chip discharge groove 5 is a helical groove having a positive helix angle, the chip discharging performance will improve further.

In view of the results of various experiments, the positive helix angle β, see FIG. 1, of the chip discharge groove 5 is preferably about 0 (zero) to 15 degrees, though depending on the diameter of the drill, the number of revolutions per minute, the depth of a hole formed by the drill (effective length of the body), etc. The positive helix angle of the chip discharge groove 5 may change at an intermediate portion of the chip discharge groove 5, but, in this case, too, the upper limit value of the positive helix angle is preferably about 15 degrees.

The helix angle γ, see FIG. 3, of each coolant delivery groove 8 is preferably about −45 to −89 degrees.

Figure 9:
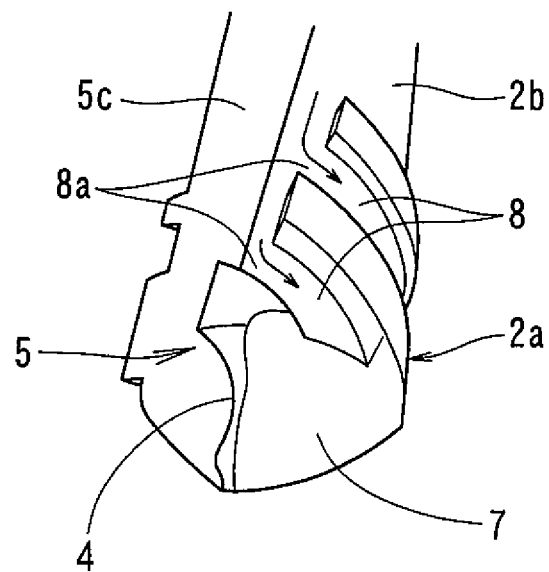
FIG. 9 is an enlarged perspective view illustrating a variation of the starting ends of coolant delivery grooves.

If the drill includes a plurality of coolant delivery grooves 8, such grooves are preferably arranged such that, as illustrated in FIG. 9, the closer the coolant delivery grooves 8 are located to the shank 3, the larger the amount by which the positions of the starting ends 8a of the coolant delivery grooves 8 are displaced rearward in the rotation direction of the drill.

With this arrangement, coolant liquid flowing in its supply direction flows into the coolant delivery grooves 8 (other than the coolant delivery groove 8 closest to the distal end of the body) without passing through the chip discharge groove 5, and thus is supplied more smoothly to the cutting tip.

Figure 10:
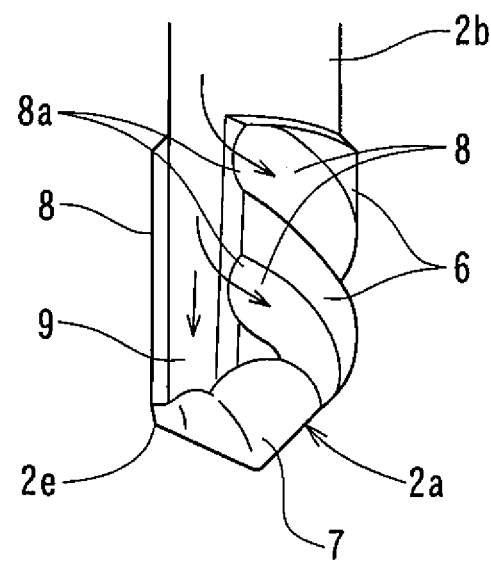
FIG. 10 is an enlarged perspective view illustrating a different variation of the starting ends of the coolant delivery grooves.

In another preferable configuration, as illustrated in FIG. 10, the starting ends 8a of the coolant delivery grooves 8 are displaced rearward in the rotation direction of the drill from the chip discharge groove 5, thereby forming a bypass path (area where no margin is present) 9 between the chip discharge groove 5 and the starting ends 8a of the coolant delivery grooves 8.

The outer diameter of the portion of the body 2 where the bypass path 9 is formed may be equal to, or smaller than, the outer diameter of the small-diameter portion 2b. Also, as illustrated in FIG. 10, the bypass path 9 is at a position displaced rearward in the rotation direction of the drill from the leading edge 2e of the large-diameter portion 2a.

While, in the shown example, the bypass path 9 is a groove extending parallel to the center axis of the drill, the bypass path 9 may be a groove inclined by −15 to 15 degrees relative to the center axis of the drill.

With this arrangement, coolant liquid flowing in the supply direction partially can flow through the bypass path 9 to the cutting tip, i.e., can be directly supplied to the cutting tip.

Figure 11:
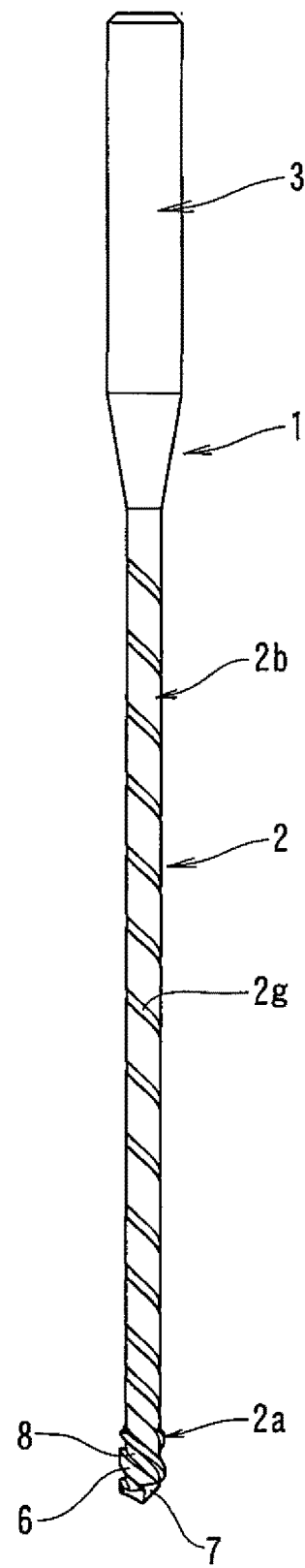
FIG. 11 is a side view illustrating a different example of the drill according to the present invention in its entirety.
Figure 12:
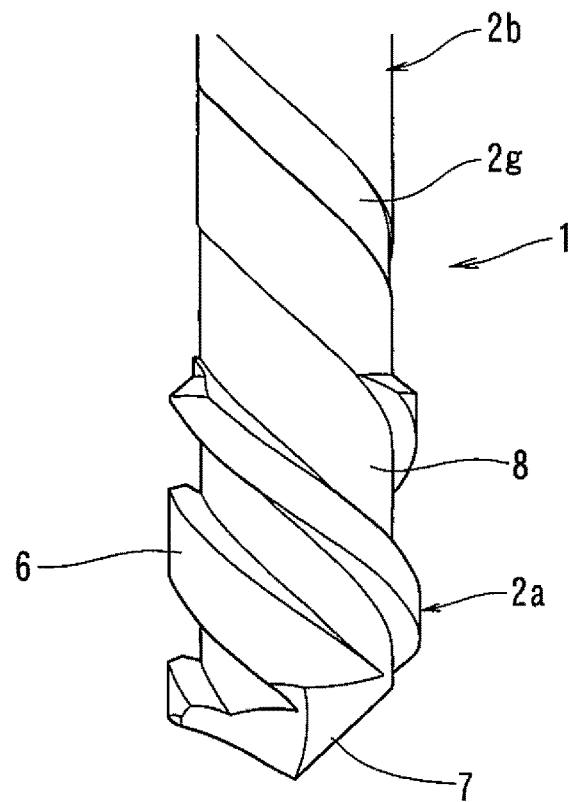
FIG. 12 is an enlarged perspective view illustrating a portion of the drill of FIG. 11 on its distal end side.

In still another preferred configuration illustrated in FIGS. 11 and 12, the drill has, in the outer periphery of the small-diameter portion 2b, a helical groove 2g twisted in the same direction as the coolant delivery grooves 8, preferably on the extended line of the coolant delivery grooves 8.

The helical groove 2g is an extremely shallow groove having a depth small enough not to affect the strength of the small-diameter portion 2b. By providing such a helical groove, coolant liquid supplied along the outer periphery of the small-diameter portion 2b is easily guided in the supply direction, and also the flow smoothing effect can be expected.

Figure 13:
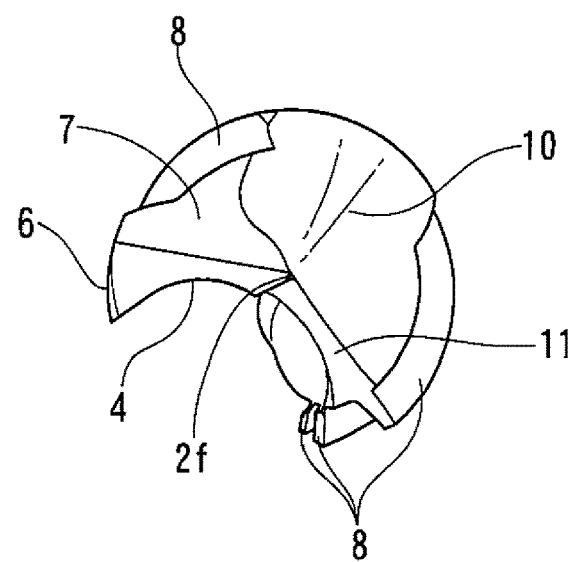
FIG. 13 is an enlarged front view illustrating a still different example of the drill according to the present invention.
Figure 14:
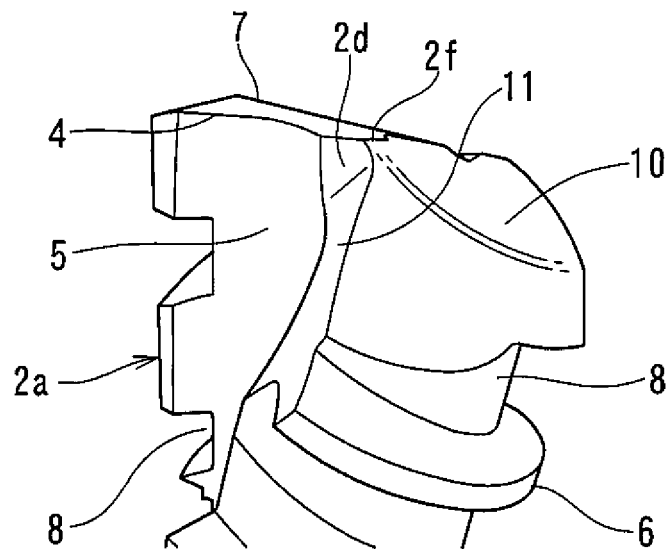
FIG. 14 is an enlarged perspective view illustrating a portion of the drill of FIG. 13 on its distal end side.
Figure 15:
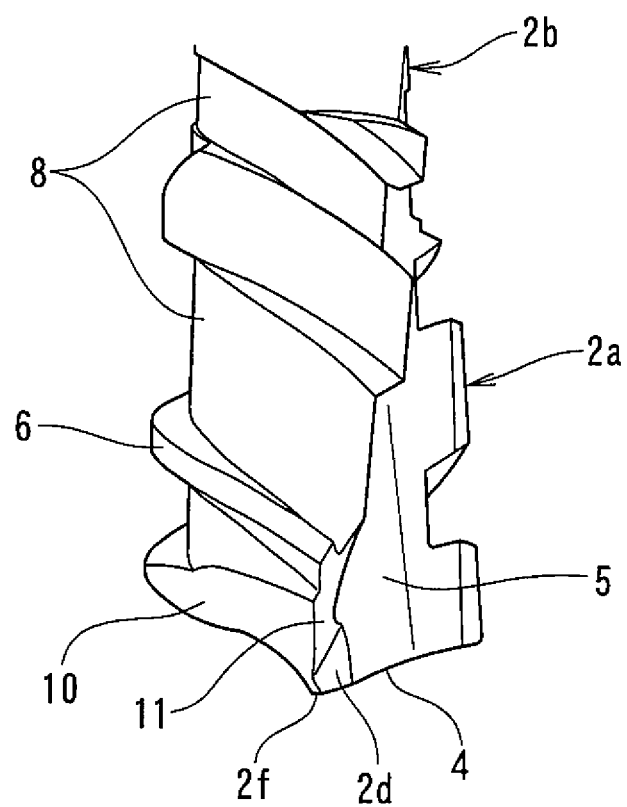
FIG. 15 is an enlarged side view illustrating a portion of the drill of FIG. 13 on its distal end side.

FIGS. 13 and 15 illustrate a coolant chamber 10 formed by recessing, toward the rear side of the drill, a portion of the flank 7 of the drill distal end located rearward in the normal rotation direction of the drill. The shown coolant chamber 10 is a concave curved chamber, and extending to a thinning heel surface 11.

The coolant delivery grooves 8 communicate with the coolant chamber 10, so that coolant liquid flows to the coolant chamber 10 through the coolant delivery grooves 8, and then flows from the coolant chamber 10 to the cutting edge 4 and the portion cut by the cutting edge 4. Such a structure is also preferable in that it can efficiently lubricate and cool the cutting edge 4 and the portion cut by the cutting edge 4.

If a plurality of coolant delivery grooves 8 are provided, one of them may have a cross-sectional area (when taken perpendicularly to the longitudinal direction of the groove) larger than those of the other coolant delivery groove or grooves, e.g., by increasing its width, so that this groove 8 serves as the main groove (see FIGS. 12 and 15).

Also, for economic reasons, the drill is preferably configured to be repolished to regenerate the function of the drill. In order to realize this, the large-diameter portion 2a may include a portion of a predetermined length extending from the distal end of the body as a removable portion for repolishing.

In such a repolishable drill, at the removable portion (for repolishing) of the large-diameter portion 2a, the groove bottom 5a of the chip discharge groove 5 is at a position which is not beyond the rotation center of the drill.

If the repolishable drill has, e.g., a diameter D of 3.2 mm, by setting the minimum value of the length of the removable portion at 0.25 mm (0.25/3.2≈0.08), the drill can be repolished twice assuming that the cutting part wears normally.

It seems that the axial length of the removable portion for repolishing is preferably about 0.08 to 0.15D. In view of this, the minimum value of the length of the large-diameter portion 2a additionally including the removable portion would be preferably 0.75D+0.08D=0.83D.

By setting the above minimum value in this way, even when the drill is repolished and the removable portion for repolishing eventually disappears, the coolant delivery grooves 8 still remain, and thus continues to deliver coolant liquid.

The above-described single-edge drill 1 for forming a deep hole according to the present invention is configured such that a gap defined between the outer peripheral surface of the small-diameter portion 2b of the body 2 and the radially inner surface of the hole being formed by the drill functions as a supply path through which coolant liquid supplied from outside the drill flows toward the large-diameter portion 2a of the body 2.

Then, the coolant liquid is pulled into the coolant delivery grooves 8 in the outer periphery of the large-diameter portion 2a, and is forcibly delivered toward the cutting tip by the pumping action of the coolant delivery grooves 8.

After cooling and lubricating the cutting tip the coolant liquid is discharged through the chip discharge groove 5 to the outside together with chips shaved off by the cutting edge 4.

At this time, the amount of coolant liquid flowing in the supply direction, and passing through the chip discharge groove 5 is extremely small (substantially zero depending on the locations of the starting ends of the coolant delivery grooves 8).

Since, as described above, the drill is configured such that a gap is defined between the outer peripheral surface of the small-diameter portion 2b and the radially inner surface of the hole being formed by the drill, and this gap functions as a supply path, the flows of coolant liquid in its supply direction and discharge direction are separated from each other, and thus never cancel each other.

This increases the amount of coolant liquid supplied to the cutting tip per unit of time, thereby cooling and lubricating the cutting tip more effectively.

Also, as the amount of coolant liquid supplied thereto increases, the amount of coolant liquid discharged per unit of time also increases. Thus, chips can be effectively washed away by coolant liquid flowing in the discharge direction, and discharged reliably.

Chips are discharged effectively due also to the feature that at the portion of the body other than its distal end portion, no core thickness is present, and as a result, the chip discharge groove 5 has an extremely large cross-sectional area when taken perpendicularly to the axial direction of the drill.

Figure 18:
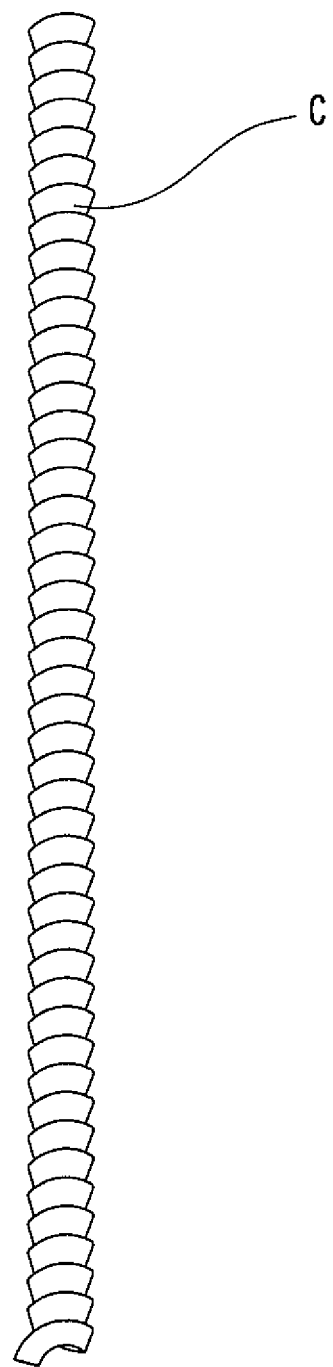
FIG. 18 is a side view illustrating an example of a chip generated when forming a hole with the drill of the present invention.

In a test in which, using a test drill having a diameter of 3.2 mm, a hole was formed in a workpiece made of S45C, a continuously curled chip C as illustrated in FIG. 18 was discharged without breaking.

This is because the chip discharge groove 5 has an extremely large cross-sectional area when taken perpendicularly to the axial direction of the drill. Since the chip C was discharged without breaking, the chip did not clog the chip discharge groove 5 at all.

Verification Test 1

A test was conducted to confirm the effectiveness of the coolant delivery grooves. In this test, a transparent test tube was prepared as an, enlarged model of a hole formed by a drill, and drill models made of resin, and each including a large-diameter portion having an outer diameter dimension equal to the inner diameter dimension of the test tube were prepared using a 3D printer.

The prepared drill models consist of thirteen kinds of drill models each having coolant delivery grooves in its large-diameter portion, the coolant delivery grooves having a helix angle different from those of the coolant delivery grooves of the other drill models.

Next, water containing a light-reflecting filler to visually confirm the flow direction of the water was poured into the test tube. Then, each drill model was inserted into the test tube, and was rotated in the direction opposite the helical direction of the coolant delivery grooves (i.e., in the normal rotation direction of the drill), and the flow of the filler-mixed water at this time was visually observed from outside the test tube.

As a result thereof, it was confirmed that, for the drill models whose coolant delivery grooves have helix angles of −45 to −89 degrees, the filler-mixed water was forced to flow toward the bottom of the test tube through their coolant delivery grooves, and the pumping action was produced reliably.

This test verifies that the helix angle γ of the coolant delivery grooves 8 in the large-diameter portion 2a of the body 2 is preferably −45 to −89 degrees.

Verification Test 2

A test was conducted to confirm the effectiveness of the small-diameter portion of the body.

In this test, three test drills were used. One of the three test drills is a drill 1 according to the present invention set at Diameter D (see FIG. 3)=3.2 mm; Large-diameter portion length L1 (FIG. 3)=5.0 mm; Tip angle α (FIG. 3)=135 degrees; Small-diameter portion diameter d (FIG. 3)=2.7 mm; Effective length L2 (FIG. 3) from the distal end to the shank=80 mm; entire length L3 (FIG. 3)=120 mm; Helix angle β (see FIG. 1) of the chip discharge groove=3 degrees, Helix angle γ (see FIG. 3) of the coolant delivery grooves=55 degrees, and groove bottom thickness t (see FIGS. 4 and 8) of the small-diameter portion≈0.6 mm. The other two test drills are commercially available deep hole-forming double-edge twist drills for comparison. The helix angles of the helical grooves of the twist drills for comparison are 40 degrees and 37 degrees, respectively.

Figure 16:
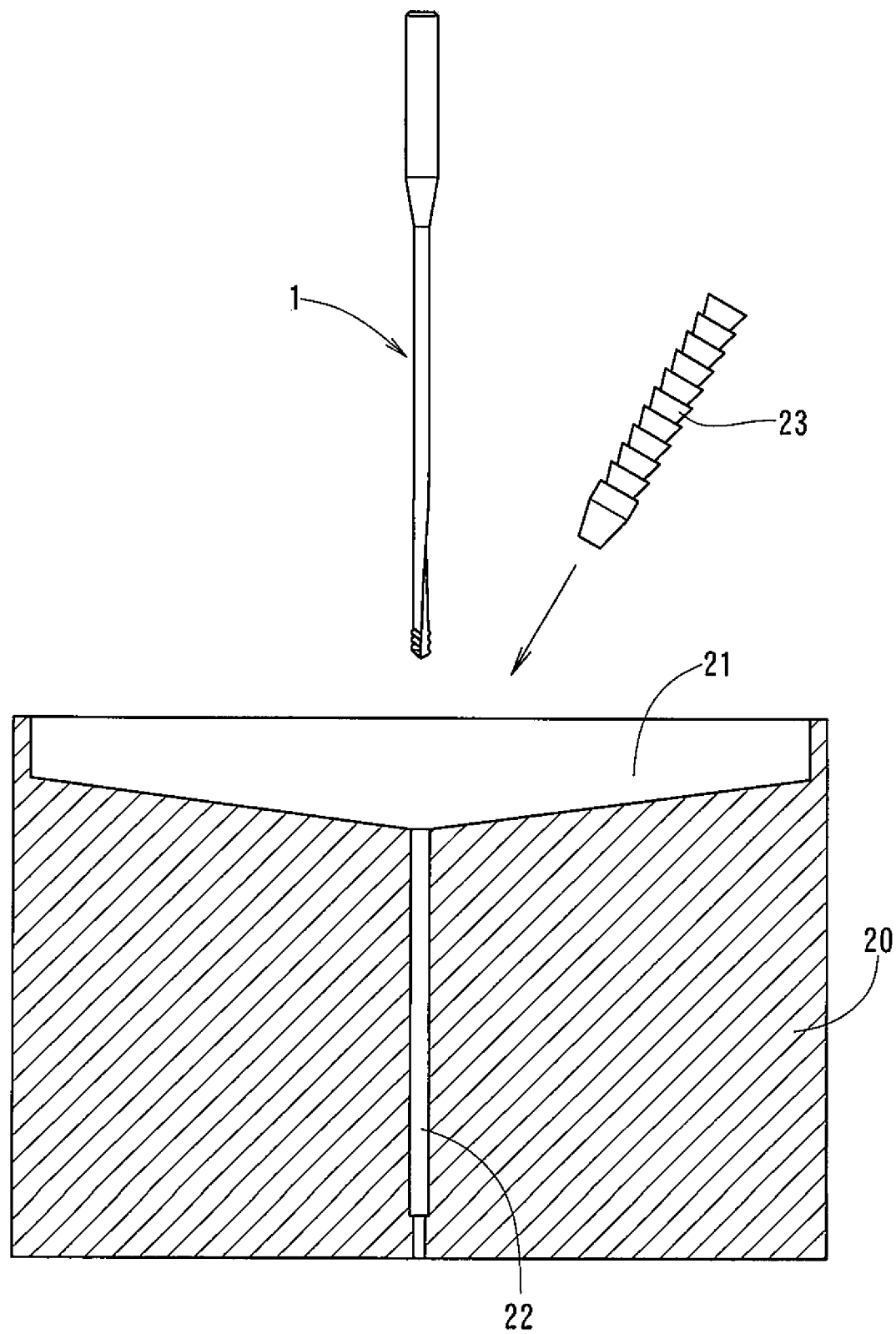
FIG. 16 is a view illustrating how a verification test was conducted to confirm the effectiveness of a small-diameter portion of the drill according to the present invention.

In this test, a transparent acrylic resin block 20 as illustrated in FIG. 16 was prepared. The transparent acrylic resin block 20 includes a pocket 21 for storing coolant liquid which is formed in the top surface of the block such that the central portion of the top surface is recessed most deeply; and a hole 22 extending through the bottom of the pocket 21 such that the test drills can be perfectly fitted in the hole 22.

Each test drill was inserted into the hole 22 of the transparent acrylic resin block 20, and was rotated at cutting speeds Vc≈25 to 80 m, which is a practically used speed range; coolant liquid was poured into the pocket 21 from an oil supply nozzle 23; and it was checked whether or not the coolant liquid would flow to the distal end of the drill.

As a result, for the test drill according to the present invention, the coolant liquid smoothly flowed to the lower portion of the hole in the entire range of cutting speeds. In contrast, for each test drill for comparison, near Vc=30, the coolant liquid which had flowed into the chip discharge groove was lifted up, and the coolant liquid supplied into the pocket 21 did not show a tendency to decrease. This indicates that no coolant liquid was supplied to the cutting tips of the test drills for comparison.

The results of this test verify that the small-diameter portion of the body according to the present invention effectively functions as a supply path for coolant liquid.

Verification Test 3

Using, as test drills, commercially available double-edge twist drills whose diameters are 3.2 mm and 5.9 mm, a test was conducted to find helix angles of the chip discharge grooves at which coolant liquid is lifted up.

The test twist drills whose diameters are 3.2 mm consist of six kinds of twist drills whose chip discharge grooves have helix angles of 12 degrees, 15 degrees, 20 degrees, 26 degrees, 30 degrees and 34 degrees, respectively. The test twist drills whose diameters are 5.9 mm consist of four kinds of twist drills whose chip discharge grooves have helix angles of 15 degrees, 20 degrees, 25 degrees and 30 degrees, respectively.

In this test, transparent acrylic resin blocks were used which include, respectively, pockets for storing coolant liquid which are each formed in the top surface of the block such that the central portion of the top surface is recessed most deeply; and holes each extending through the bottom of the pocket, and having, respectively, diameters of 3.2 mm and 5.9 mm so that each test twist drill can be perfectly fitted in the corresponding hole.

Each test twist drill was inserted into the hole of the transparent acrylic resin block equal in diameter to the drill, and coolant liquid was poured into the pocket in the top surface of the transparent acrylic resin block while rotating the drill at a predetermined number of revolutions. Then, the number of revolutions of the drill was increased and decreased in this state to find numbers of revolutions of the drill at which the coolant liquid in the pocket does not decrease (does not flow into the hole) due to the lifted-up effect.

The results are summarized as follows:

<Test Twist Drills Whose Diameters are 3.2 mm>

Chip discharge groove helix angles 12 degrees: 9,000 rpm, 15 degrees: 8,000 rpm, 20 degrees: 7,000 rpm, 26 degrees: 6,000 rpm, 30 degrees: 5,000 rpm, and 34 degrees: 4,000 rpm <Test Twist Drills Whose Diameters are 5.9 mm>

Chip discharge groove helix angles 15 degrees: 3,100 rpm, 20 degrees: 2,700 rpm, 25 degrees: 2,500 rpm, and 30 degrees: 2,200 rpm The smaller the torsion angle of the chip discharge grooves of a drill, the better in terms of ensuring torsion rigidity of the body. On the other hand, in terms of chip discharging performance, the helix angle of the chip discharge grooves is preferably as large as possible to such an extent that coolant liquid is not lifted up.

It seems that, as a balanced helix angle satisfying both of the above two points, and further taking account of generally used cutting conditions and the machinability of the helical groove, too, the helix angle of the chip discharge grooves of the drill according to the present invention is preferably set at about 0 to 15 degrees.

Verification Test 4

Using the test drill 1 according to the present invention used in verification test 2, a hole was formed in a test piece made of transparent acrylic resin, and it was visually checked whether or not coolant liquid flowing downwardly along the outer periphery of the small-diameter portion of the body would flow to the cutting tip due to the pumping action of the coolant delivery groove in the outer periphery of the large-diameter portion. In this test, the cutting speed was set at Vc=10 m.

In this test, since the workpiece (test piece) is made of acrylic resin, and thus has a high ductility, sponge-shaped solid chips were generated instead of a curled chip as generated from a metallic workpiece, and these chips clogged the inlet (starting end) of the chip discharge groove. Thus, the state of the hole was observable only up to the depth of around 11D relative to the diameter of the drill, but, within this range, it was confirmed that coolant liquid flowing downwardly along the outer periphery of the small-diameter portion of the body flowed through the coolant delivery grooves and reliably reached around the cutting tip.

Also, using a test drill 2 according to the present invention of which the small-diameter portion has an outer diameter of 2.5 mm (with the other specifications the same as the test drill 1 according to the present invention), a test was conducted to confirm the difference between the effects of the test drill 1 and the test drill 2. In this test, it was possible to observe the state of the hole up to the depth of 17D relative to the diameter of the drill. Thus, it was confirmed that the capability to guide coolant liquid is affected by, e.g., the size of the clearance between the small-diameter portion of the drill and the wall surface of the formed hole. A workpiece made of acrylic resin was used in this test, too.

The same test was conducted using the test drills for comparison used in verification test 3. With these test drills for comparison, it became difficult to lubricate the cutting tip with coolant liquid at around the depth of 2D to 3D. Thus, there was a clear difference between the test drill according the present invention and the test drills for comparison in terms of delivering coolant liquid.

Verification Test 5

Using the test drill according to the present invention used in verification test 2 (diameter D=3.2 mm), a hole was formed in a workpiece made of S45C, and it was checked whether or not coolant liquid supplied by an external oil supply method would be reliably delivered to the cutting tip.

Figure 17:
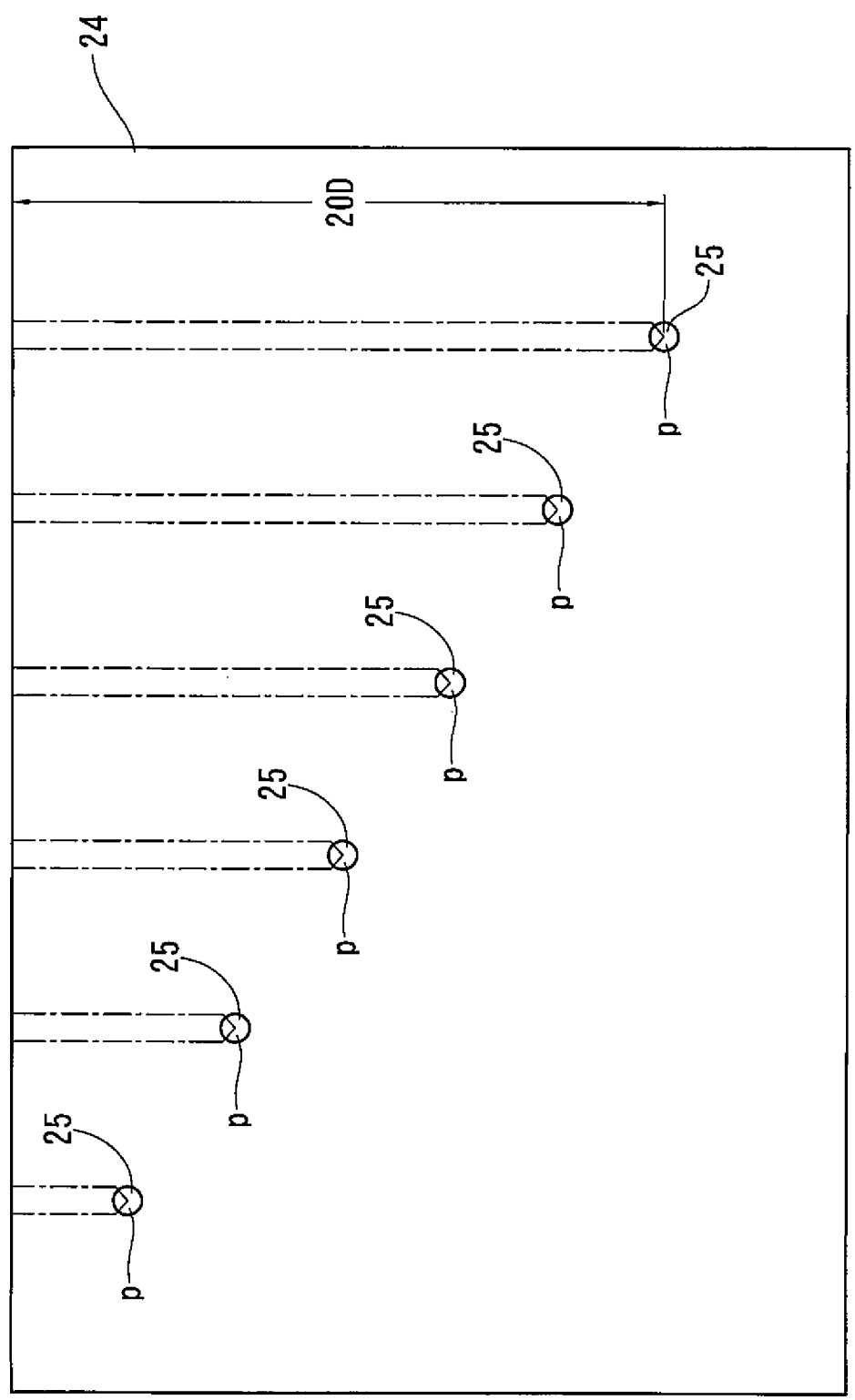
FIG. 17 is a view illustrating how a verification test was conducted to check if, when forming, with the drill of the present invention, holes in a workpiece made of S45C, coolant liquid supplied by an external oil supply method would be reliably delivered to the cutting part of the drill.

This test was conducted as follows: as illustrated in FIG. 17, transparent acrylic resin members as window holes 25 were embedded in the workpiece 24 at a plurality of points p corresponding to different depths of the deep hole being formed by the drill; and the moment when the drill reached each point p was shot through the acrylic window hole 25 with a high-speed camera (super slow camera).

The results of this test confirmed that, when the distal end of the drill reached each point p, coolant liquid was reliably being supplied to the cutting tip of the drill, more specifically, that, at the position where the hole depth reached 20D relative to the diameter of the drill, and the remaining points P, at which the hole depth had not reached 20D, coolant liquid was being sufficiently delivered to the cutting tip of the drill.

Verification Test 6

A test drill according to the present invention was prepared which was set at diameter D=5.9 mm, large-diameter portion length L1=9.2 mm, distal end angle α=135 degrees, small-diameter portion diameter=5.0 mm, effective length L3 from the distal end to the shank=148 mm, entire length L4=220 mm, helix angle β of the chip discharge groove=3 degrees, and helix angle γ of the coolant delivery groove=55 degrees. Using this test drill, the same confirmation test as in verification test 5 was conducted. The test results were the same as in verification test 5.

Verification Test 7

Using each of the test drill according to the present invention used in verification test 5, i.e., set at diameter D=3.2 mm, and the test drill according to the present invention used in verification test 6, i.e., set at diameter D=5.9 mm, deep holes having a depth of 20D relative to the diameter of the drill were continuously formed in a workpiece made of S45C under the following cutting conditions:

<Cutting Conditions of the Test Drill Whose Diameter D=3.2>

Cutting speed Vc=50 m (number of revolutions n=5,000 rpm), advancement f=0.15 mm/rev <Cutting Conditions of the Test Drill Whose Diameter D=5.9>

Cutting speed Vc=28 m (number of revolutions n=1,500 rpm), advancement f=0.03 mm/rev <Other Cutting Conditions of Each Test Drill>

An external oil supply method was used.

Each hole was formed after marking, with a center drill, a predetermined portion of the workpiece for forming the hole.

As a result of this test, holes were successfully continuously formed with each of the test drills. Despite the fact that each test drill has no core thickness at most of the small-diameter portion of its body, there was no drill vibration resulting from lack of rigidity while forming the hole, and abnormality was not observed at all even after forming thirty holes.

Also, since the groove surface of the chip discharge groove is curved in a concave circular arc shape, and the body has no core thickness at most of its small-diameter portion, and as a result, the chip discharge groove has a large sectional area, a chip C generated when forming a hole as described above was discharged while rotating without receiving stress. Therefore, the chip C maintained a regularly curled shape as illustrated in FIG. 18, and was continuously discharged without being broken at intermediate portions.

As can be seen from the results of the above verification tests, too, it is possible to stably form, with the drill of the present invention, even a deep hole having a depth of more than 20D relative to the diameter of the drill without performing step feed while using a machining tool including no internal oil supply means.

The drill of the present invention is particularly suitable for forming a hole in a workpiece made of metal such as S45C, but can form a hole in a workpiece made of any material other than metal, too.

If the present application is applied to a drill which has a small diameter, and thus in which it is difficult to form an oil hole, its effectiveness is particularly remarkably seen. However, even if the present invention is applied to a drill having a large diameter, since internal coolant supply means are not required, sufficient benefits can be expected.

DESCRIPTION OF REFERENCE NUMERALS

1: Single-edge drill for forming a deep hole
2: Body
2a: Large-diameter portion
2b: Small-diameter portion
2c: Outer peripheral surface
2d: Thinning groove
2e: Leading edge
2f: Chisel edge
2g: Helical groove
3: Shank
4: Cutting edge
5: Chip discharge groove
5a: Groove bottom
5b: Rising portion
5c: Groove surface
6: Margin
7: Flank
8: Coolant delivery groove
8a: Starting end
9: Bypass path
10: Coolant chamber
11: Thinning heel surface
α: Tip angle
β: Helix angle of the chip discharge groove
γ: Helix angle of the coolant delivery groove
δ: Inclination angle of a core-tapered portion
D: Drill diameter
d: Outer diameter of the small-diameter portion
L1: Axial length of the large-diameter portion
L2: Effective length
L3: Entire length
X: Terminal end of the core-tapered portion
O: Rotation center of the drill
20: Transparent acrylic resin block
21: Pocket
22: Hole formed in the transparent acrylic resin block
23: Oil supply nozzle
24: Workpiece
25: Window hole
p: Hole depth points of formed deep holes
C: Chip

The invention claimed is:

1. A single-edge drill for forming a deep hole comprising:
a body including a cutting edge at a distal end of the body; and
a shank connected to the body so as to be located rearward of the body,
wherein in using the drill, an external oil supply method is used,
wherein the body has, in an outer periphery of the body, a single chip discharge groove having a concave curved groove surface, and extending from a cutting tip of the drill toward the shank in a center axis direction,
wherein the body includes:
a large-diameter portion having a predetermined length from the distal end of the body toward the shank, and having an outer peripheral surface constituting a margin; and
a small-diameter portion located between the large-diameter portion and the shank, and having a diameter smaller than a diameter of the large-diameter portion,
wherein the large-diameter portion includes, in an outer periphery of the large-diameter portion, at least one coolant delivery groove twisted in a direction opposite a normal rotation direction of the drill,
wherein, the chip discharge groove has a groove bottom including a first portion spanning either an entirety of the large-diameter portion or at least a distal end side portion of the large-diameter portion, and located at a position not beyond a rotation center of the drill, thereby providing a core thickness to the body at the first portion of the groove bottom,
wherein, a second portion of the groove bottom other than the first portion of the groove bottom is located beyond the rotation center of the drill such that, at the second portion of the groove bottom, the body has no core thickness, and a cross section of the body perpendicular to the center axis direction has a crescent shape constituted by a combination of:

an outer peripheral surface constituted by a first cutout circle larger than a cutout circle formed by cutting out ⅓ of a perfect circle; and a groove surface constituted by a second cutout circle having a diameter smaller than a diameter of the outer peripheral surface constituted by the first cutout circle, and wherein the drill is configured such that a supply path for coolant liquid is defined between an outer peripheral surface of the small-diameter portion and a radially inner surface of a hole being formed by the drill.

2. The single-edge drill according to claim 1, wherein the chip discharge groove is a helical groove twisted in the normal rotation direction of the drill so as to have a positive helix angle of 15 degrees or less.

3. The single-edge drill according to claim 1, wherein the at least one coolant delivery groove has a helix angle of −45 to −89 degrees.

4. The single-edge drill according to claim 1, wherein the at least one coolant delivery groove comprises a plurality of coolant delivery grooves disposed such that the closer the coolant delivery grooves are located to the shank, the larger an amount by which positions of starting ends of the coolant delivery grooves are displaced rearward in the normal rotation direction of the drill.

5. The single-edge drill according to claim 1, wherein the small-diameter portion includes, in an outer periphery of the small-diameter portion, a helical groove twisted in a same direction as the at least one coolant delivery groove.

6. The single-edge drill according to claim 1, wherein the body includes:

a flank at the distal end of the body;

a coolant chamber formed by recessing, toward a rear side of the drill, a portion of the flank located rearward in the normal rotation direction of the drill; and a thinning heel surface to which the coolant chamber extends, and wherein the at least one coolant delivery groove communicates with the coolant chamber.

7. The single-edge drill according to claim 1, wherein the at least one coolant delivery groove comprises a plurality of coolant delivery grooves, and a cross-sectional area of one of the coolant delivery grooves when taken perpendicularly to a longitudinal direction thereof is larger than corresponding cross-sectional areas of the other coolant delivery groove or grooves.

8. The single-edge drill according to claim 1, wherein, in an area between the distal end of the body and a point X displaced from the distal end of the body toward the shank by a predetermined length, the groove bottom of the chip discharge groove is core-tapered such that a groove depth of the chip discharge groove gradually increases toward the shank, and wherein in an area between the point X and a rising portion at a terminal end of the chip discharge groove, the groove depth of the chip discharge groove is uniform, or gradually and slightly increases or decreases toward the rising portion.

9. The single-edge drill according to claim 1, wherein the large-diameter portion has a length of 0.75 to 4.0D wherein D is a drill diameter, and wherein the drill further includes a removable portion for repolishing, the removable portion having a length of 0.08 to 0.15D from the distal end of the body, and having a core thickness.

* * * * *